Patented Apr. 6, 1954

2,674,629

UNITED STATES PATENT OFFICE 2,674,629

PRODUCTION OF HYDROPEROXIDES USING BETA-KETONIC ESTERS AS OXIDATION INITIATORS

Igor Scriabine, Lyons, France, assignor to Societe des Usines Chimiques Rhone-Poulenc, Paris, France, a French body corporate No Drawing. Application April 3, 1953, Serial No. 346,806

Claims priority, application France April 11, 1952

7 Claims. (Cl. 260—610)

This invention is for improvements in or relating to the production of the hydroperoxides of cumene and other aliphatic-aromatic hydrocarbons including the homologues of cumene. It has especial reference to the production of cumene hydroperoxide.

It is known that the hydroperoxides of various hydrocarbons can be prepared by passing oxygen or an oxygen-containing gas through the hydrocarbon in the liquid phase at elevated temperature. The reaction is very slow and passes through an initial induction period during which the absorption of oxygen is practically nil; it is only after the formation of a certain amount of hydroperoxide that the reaction velocity reaches a suitable rate. It is also known that this induction period can be eliminated or, at least, reduced by introducing into the reaction mixture at the commencement an initiator consisting of a hydroperoxide which can be, for example, the hydroperoxide of the hydrocarbon to be oxidised. Furthermore, it is known that in the aforesaid reaction by-products are also formed which exert an inhibiting and retarding action tending to reduce the yield of the desired hydroperoxide; it has been proposed to overcome the injurious effect of these by-products to some extent by adding to the reaction medium various substances such as sodium hydroxide or carbonate, formates, oxalates or benzoates of alkali metals or alkaline earth metals, or benzoic acid. Such substances will be referred to hereinafter as "anti-inhibitors."

It is an object of the present invention to provide a new and unexpectedly useful class of anti-inhibitors or accelerators for use in the aforesaid process.

According to the present invention, a process for the production of hydroperoxides of hydrocarbons containing an aromatic nucleus comprises subjecting the parent hydrocarbon in the liquid phase to treatment with oxygen at elevated temperature in the presence of a β-ketonic ester.

The hydrocarbons to which the process of this invention is particularly applicable are aromatic hydrocarbons with at least one alkyl or cycloalkyl group or a fused hydrogenated cyclic nucleus, said group or said nucleus having a secondary or tertiary carbon atom to which the hydroperoxide radical can be attached. An example of alkyl aromatic hydrocarbons with a secondary carbon atom is ethylbenzene. Among the hydrocarbons with a tertiary carbon atom, the most important is cumene, the hydroperoxide of which has gained a considerable industrial importance by reason of the facility with which it can be decomposed into phenol and acetone. Secondary butylbenzene and aromatic hydrocarbons containing several alkyl groups such as p-cymene and the di-isopropylbenzenes may also be cited. Cyclohexylbenzene is an example of a suitable cycloalkylaromatic hydrocarbon. The aromatic hydrocarbons with a fused hydrogenated nucleus are represented for example by tetrahydronaphthalene.

The β-ketonic ester accelerators preferably are such as conform to the general formula: R'—CO—CHR''—COO—R, in which R represents an aliphatic radical; R' represents a substituted or unsubstituted aliphatic, cycloaliphatic, aromatic or heterocyclic radical, or a carbalkoxy group R'''—O—CO or carbalkoxymethyl group R'''—OCO—CH₂—, R'' represents an atom of hydrogen, an alkyl radical or an acyl group or constitutes with R' a divalent aliphatic chain forming with the CO radical an iso-cyclic chain or constitutes with R a divalent aliphatic chain forming, with the COO group, a heterocyclic chain. As examples of esters having the foregoing general formula may be cited:

Ethyl acetoacetate
Ethyl isonitrosoacetoacetate
Ethyl benzoylacetate
Ethyl nitrobenzoylacetate
Ethyl furoylacetate
Ethyl oxalacetate
Diethyl ester of acetonedicarboxylic acid
Ethyl benzoylacetoacetate
2-carbethoxy-cyclopentanone
Acetobutyrolactone While ethyl esters such as those above listed are in general preferred other esters, for example the methyl and propyl can, of course, be employed.

The quantities of β-ketonic ester to be used may vary within fairly wide limits; in general good results are obtained with quantities between 0.1 and 0.35% on the weight of hydrocarbon to be oxidised. While the accelerative effect does not appear substantially to vary according to the β-ketonic ester employed, ethyl acetoacetate and ethyl benzoylacetate nevertheless appear to be particularly advantageous. The β-ketonic esters may be employed alone or conjointly with other oxidation initiators and/or catalysts.

In order to illustrate the invention and especially to demonstrate the action of the new anti-inhibitors, comparative experiments have been carried out in two different types of apparatus. The one apparatus consists of a heated closed vessel fitted with an agitator which ensures effective contact of the oxygen with the hydrocarbon contained in the apparatus. The apparatus is connected to a gasometer containing oxygen: this apparatus permits of precise and continuous recording of the absorbed oxygen. The other apparatus consists of a column filled with the hydrocarbon to be oxidised; the finely divided oxidising gas bubbles through the column, carrying along the liquid which circulates in a closed circuit in the column.

In the experiments in the closed vessel (experiments A), the quantity of oxygen absorbed is measured at different intervals of time. In the experiments made in the column (experiments B), samples are extracted periodically and the hydroperoxide content thereof is determined by iodometric estimation. The results are shown in the following tables. The first column of figures gives the percentage in weight of β-ketonic ester added to the hydrocarbon. The other columns give as a function of the duration of the oxidation the percentage by weight of hydroperoxide formed, calculated in the case of experiments A from the quantity of oxygen absorbed, and in the case of experiments B by titration of the samples periodically extracted.

oxidation with a general acceleration of the oxidative reaction. Thus, for example, at 110° C., the cumene alone requires one hour for oxidation to an extent of 1.0 to 1.4%. The addition of β-ketonic ester enables this point or even higher percentage to be reached after only a quarter-of-an-hour. After 3 hours, the percentage conversion in the presence of β-ketonic ester is 2.5 to 3 times greater than in the absence of the ester.

From Table 2, when working in the presence of ethyl benzoylacetate, ten times more ethylbenzene is oxidised in the first quarter-of-an-hour. After oxidation for 3 hours the percentage conversion is still four times greater in the presence of β-ketonic ester.

From Table 3, it is clear that the oxidation of p-cymene proceeds three to four times more rapidly in the presence of ethyl acetoacetate.

I claim:

1. A process for the production of hydroperoxides of hydrocarbons which comprises subjecting the parent hydrocarbon in the liquid phase to treatment with oxygen at elevated temperature in the presence of a β-ketonic ester.

2. A process for the production of hydroperoxides of aromatic hydrocarbons containing a substituent in the form of a member of the class consisting of alkyl, cycloalkyl and a hydrogenated Table 1.—Experiments carried out with cumene

EXPERIMENTS AT 110° C.

|   | Initiator | Percent | 15 mins. | 30 mins. | 45 mins. | 1 hr. | 1½ hrs. | 2 hrs. | 2½ hrs. | 3 hrs. |
|---|---|---|---|---|---|---|---|---|---|---|
| A | Not added (Comparison) |  |  | 0.1 | 0.25 | 0.5 | 1.0 | 2.0 | 3.6 | 4.7 | 6.3 |
| B | Not added (Comparison) |  |  |  |  |  | 1.4 | 2.4 | 3.8 | 5.6 | 7.2 |
| A | Ethyl acetoacetate | 0.35 | 1.7 | 4.0 | 6.2 | 8.0 | 12.6 | 16.5 | 21.0 |  |
| A | Ethyl acetoacetate |  |  | 3.9 |  | 6.8 | 9.9 | 13.4 | 16.3 | 19.0 |
| B | Ethyl acetoacetate |  | 1.1 | 2.3 | 3.8 | 5.0 | 7.6 | 10.3 | 13.5 | 18.0 |
| A | Ethyl benzoylacetate | 0.1 | 1.7 | 3.5 | 5.4 | 7.1 | 10.5 | 14.1 |  | 18.3 |
| A | Ethyl benzoylacetate | 0.3 | 1.4 | 2.8 | 4.5 | 5.5 | 7.9 | 11.2 | 14.6 | 17.8 |
| A | Ethyl oxalacetate | 0.1 | 1.9 | 3.8 | 5.4 | 7.1 | 9.7 | 13.4 | 16.5 | 19.4 |
| A | Ethyl ester of acetone dicarboxylic acid. | 0.2 |  |  |  |  |  |  |  |  |
| A | Ethyl benzoylacetoacetate | 0.2 | 1.6 | 3.2 | 5.0 | 8.0 | 9.8 | 13.9 | 16.5 | 19.3 |
| A | 2-carbethoxycyclopentanone. | 0.25 | 1.7 | 2.8 | 4.2 | 7.9 | 11.3 | 15.3 | 16.8 | 19.0 |

EXPERIMENTS AT 115° C.

|   | Initiator | Percent | 15 mins. | 30 mins. | 45 mins. | 1 hr. | 1½ hrs. | 2 hrs. | 2½ hrs. | 3 hrs. |
|---|---|---|---|---|---|---|---|---|---|---|
| A | Not added (Comparison) |  |  | 0.3 | 0.9 | 1.8 | 2.7 | 4.7 | 7.2 | 10.2 | 13.5 |
| B | Not added (Comparison) |  |  |  | 1.9 |  | 3.8 | 5.7 | 7.6 | 9.3 | 11.2 |
| A | Ethyl acetoacetate | 0.1 | 1.3 | 3.0 | 4.1 | 5.6 | 8.5 | 12.4 |  | 21.1 |
| A | Ethyl acetoacetate | 0.1 |  | 4.4 |  | 7.7 | 10.8 | 13.6 | 16.5 | 19.5 |
| B | Ethyl benzoylacetate | 0.1 |  | 3.7 |  | 7.2 | 10.1 | 13.1 | 15.7 | 18.7 |

EXPERIMENTS AT 120° C.

|   | Initiator | Percent | 15 mins. | 30 mins. | 45 mins. | 1 hr. | 1½ hrs. | 2 hrs. | 2½ hrs. | 3 hrs. |
|---|---|---|---|---|---|---|---|---|---|---|
| A | Ethyl benzoylacetate | 0.1 | 2.0 | 4.0 | 6.2 | 7.2 | 10.7 | 14.7 | 18.6 | 21.7 |

Table 2.—Experiments carried out with ethylbenzene at 115° C.

|   | Initiator | Percent | 15 mins. | 30 mins. | 45 mins. | 1 hr. | 1½ hrs. | 2 hrs. | 2½ hrs. | 3 hrs. |
|---|---|---|---|---|---|---|---|---|---|---|
| A | Not added (Comparison) |  |  | 0.05 | 0.15 |  | 0.25 |  | 0.6 |  | 1.0 |
| A | Ethyl benzoylacetate | 0.2 | 0.5 | 0.9 | 1.2 | 1.8 | 2.4 | 3.0 | 3.7 | 4.3 |

Table 3.—Experiments carried out with p-cymene at 120° C.

|   | Initiator | Percent | 15 mins. | 30 mins. | 45 mins. | 1 hr. | 1½ hrs. | 2 hrs. | 2½ hrs. | 3 hrs. |
|---|---|---|---|---|---|---|---|---|---|---|
| A | Not added (Comparison) |  |  | 0.3 | 0.5 | 0.7 | 0.8 | 1.3 | 2.3 | 3.5 | 4.7 |
| A | Ethyl acetoacetate | 0.18 | 1.3 | 2.6 | 3.8 | 5.0 | 7.0 | 9.4 | 12. | 13.5 |

It is evident from Table 1 that the addition of a β-ketonic ester effectively eliminates the usual induction period, initiating immediate cumene cyclic nucleus fused thereto, each substituent having a secondary carbon atom which comprises subjecting the said hydrocarbon in the liquid phase to treatment with oxygen at elevated temperature in the presence of a β-ketonic ester.

3. A process for the production of hydroperoxides of aliphatic-aromatic hydrocarbons containing a substituent in the form of a member of the class consisting of alkyl, cycloalkyl and a hydrogenated cyclic nucleus fused thereto, each substituent having a tertiary-carbon atom which comprises subjecting the said hydrocarbon in the liquid phase to treatment with oxygen at elevated temperature in the presence of a β-ketonic ester.

4. A process for the production of cumene hydroperoxide which comprises subjecting cumene in the liquid phase to treatment with oxygen at elevated temperature in the presence of a β-ketonic ester in the proportion of 0.1 to 0.35 part per hundred parts of hydrocarbon treated.

5. Process as claimed in claim 4 wherein the ester is selected from ethyl acetoacetate and ethyl benzoylacetate.

6. A process for the production of ethylbenzene hydroperoxide which comprises subjecting ethylbenzene in the liquid phase to treatment with oxygen at elevated temperature in the presence of a β-ketonic ester in the proportion of 0.1 to 0.35 part per hundred parts of hydrocarbon treated.

7. In a process for the peroxidation of an aromatic hydrocarbon substituted by a hydrocarbon radical having a carbon atom in one of the states secondary and tertiary and to which a hydroperoxide function can be attached in which the hydrocarbon is subjected in the liquid phase to treatment with oxygen at elevated temperature, the step which consists in conducting the reaction in the presence of a minor proportion of a β-ketonic ester of the general formula—

in which R is an aliphatic radical, R' is a member of the class consisting of aliphatic, cycloaliphatic, aromatic and heterocyclic, carbalkoxy and carbalkoxymethyl radicals and R'' when monovalent is selected from hydrogen, alkyl and acyl and when divalent is a divalent aliphatic chain forming with one of R and R' a closed ring containing the radical linking them.

No references cited.